(12) United States Patent
Lindig et al.

(10) Patent No.: US 9,989,768 B2
(45) Date of Patent: *Jun. 5, 2018

(54) SPECTACLE LENS FOR A DISPLAY DEVICE THAT CAN BE FITTED ON THE HEAD OF A USER AND GENERATES AN IMAGE (71) Applicant: Carl Zeiss Smart Optics GmbH, Aalen (DE)

(72) Inventors: Karsten Lindig, Erfurt (DE); Hans-Juergen Dobschal, Kleinromstedt (DE)

(73) Assignee: tooz technologies GmbH, Aalen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/304,849

(22) PCT Filed: Apr. 16, 2015

(86) PCT No.: PCT/EP2015/058279
§ 371 (c)(1),
(2) Date: Oct. 17, 2016

(87) PCT Pub. No.: WO2015/158834
PCT Pub. Date: Oct. 22, 2015

(65) Prior Publication Data
US 2017/0184851 A1 Jun. 29, 2017

(30) Foreign Application Priority Data
Apr. 17, 2014 (DE) .................. 10 2014 207 500

(51) Int. Cl.
G02C 1/00 (2006.01)
G02B 27/14 (2006.01)
(Continued)

(52) U.S. Cl.
CPC ....... *G02B 27/0172* (2013.01); *G02B 6/0001* (2013.01); *G02C 7/02* (2013.01);
(Continued)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 4,941,012 A  7/1990 Inabata
5,369,415 A  11/1994 Richard et al.
(Continued)

FOREIGN PATENT DOCUMENTS

DE  102011007811 A1  10/2012
DE  102011007812 A1  10/2012
(Continued)

OTHER PUBLICATIONS

International Preliminary Report on Patentability rendered by the International Bureau of WIPO for PCT/EP2015/058279, dated Oct. 27, 2016, 19 pages.

*Primary Examiner* — Dawayne A Pinkney
(74) *Attorney, Agent, or Firm* — Skaar Ulbrich Macari, P.A.

(57) ABSTRACT

A spectacle lens for a display device can be fitted on the head of a user and generate an image. The spectacle lens includes a front side and a rear side, a coupling-in section and a coupling-out section spaced apart from the coupling-in section, as well as a light guiding channel which is suitable for guiding light bundles of pixels of the generated image, which are coupled into the spectacle lens via the coupling-in section of the spectacle lens, in the spectacle lens to the coupling-out section, by which they are coupled out of the spectacle lens. The light guiding channel includes a first (Continued)

reflecting layer, which extends from the coupling-in section to the coupling-out section and on which the light bundles are reflected for guiding to the coupling-out section. The first reflecting layer includes at least one transparent gap.

15 Claims, 7 Drawing Sheets

(51) Int. Cl.

| | | |
|---|---|---|
| *G03H 1/00* | (2006.01) | |
| *G02F 1/1335* | (2006.01) | |
| *G03B 21/26* | (2006.01) | |
| *G09G 5/00* | (2006.01) | |
| *G02B 27/01* | (2006.01) | |
| *G02C 7/02* | (2006.01) | |
| *G02C 11/00* | (2006.01) | |
| *F21V 8/00* | (2006.01) | |

(52) U.S. Cl.
CPC ...... *G02C 11/10* (2013.01); *G02B 2027/0178* (2013.01); *G02C 2202/16* (2013.01)

(58) Field of Classification Search
CPC ......... G02B 27/01; G09F 19/18; G03B 21/00; G03B 21/14; G09G 3/003; A61B 3/103; A61B 3/14; A61B 3/113; A61B 3/1225
USPC ...... 359/630–634, 13–14; 349/11; 310/49 R, 310/156.32, 156.33, 156.34, 156.35, 310/266–268, 156.02; 353/11–12, 28, 353/119; 345/7, 9; 351/200, 205–206, 351/210, 221; 340/438, 980, 995.1, 340/815.47, 815.74

See application file for complete search history.

(56) References Cited

U.S. PATENT DOCUMENTS

| | | |
|---|---|---|
| 7,513,674 B1 | 4/2009 | Donahue |
| 2007/0008624 A1* | 1/2007 | Hirayama .......... G02B 27/0081 359/630 |
| 2012/0001833 A1 | 1/2012 | Lindig et al. |
| 2012/0229367 A1* | 9/2012 | Magyari ............ G02B 27/0172 345/8 |
| 2012/0249899 A1 | 10/2012 | Berthelot et al. |
| 2013/0163089 A1 | 6/2013 | Bohn |
| 2015/0260992 A1* | 9/2015 | Luttmann .......... G02B 27/0172 359/631 |
| 2016/0313557 A1* | 10/2016 | Schmidt .................. G02B 3/08 |

FOREIGN PATENT DOCUMENTS

| | | | |
|---|---|---|---|
| EP | 2343591 A1 | 7/2011 | |
| WO | 2010034639 A2 | 4/2010 | |
| WO | WO 2015044297 A1 * | 4/2015 | .............. G02B 3/08 |

* cited by examiner

SPECTACLE LENS FOR A DISPLAY DEVICE THAT CAN BE FITTED ON THE HEAD OF A USER AND GENERATES AN IMAGE

PRIORITY

This application claims the benefit of German Patent Application No. 102014207500.9 filed on Apr. 17, 2014, which is hereby incorporated herein by reference in its entirety.

FIELD

The present invention relates to a spectacle lens for a display device that can be fitted on the head of a user and generates an image, wherein the spectacle lens comprises a front side and a rear side, a coupling-in section and a coupling-out section, spaced apart from the coupling-in section, as well as a light guiding channel, which is suitable for guiding light bundles of pixels of the generated image, which are coupled into the spectacle lens via the coupling-in section of the spectacle lens, in the spectacle lens to the coupling-out section, by which they are coupled out of the spectacle lens, wherein the light guiding channel comprises a first reflecting layer, which extends from the coupling-in section to the coupling-out section and on which the light bundles are reflected for guiding to the coupling-out section.

BACKGROUND

With a spectacle lens, there is the difficulty that because of the reflecting property of the reflecting layer of the light guiding channel, this is clearly set apart for a user from other areas of the spectacle lens when the surroundings are viewed through the spectacle lens.

SUMMARY

An object of the invention is to provide a spectacle lens where the optically striking distinction between the light guiding channel on the one hand and the rest of the spectacle lens on the other hand is reduced.

The disclosure includes a spectacle lens where the first reflecting layer comprises at least one transparent gap. The transmissivity of the light guiding channel in comparison with a solution in which the reflecting layer is continuous is thus increased.

The reflecting layer can be formed segmented and comprise reflecting segments which are separated from each other by the at least one gap.

In particular, the first reflecting layer comprises several transparent gaps spaced apart from each other. The several gaps can be spaced apart in a first direction from the coupling-in section towards the coupling-out section and/or transverse to the first direction.

Furthermore, the several gaps can be arranged equidistantly in a predetermined direction (e.g. the first direction and/or transverse thereto). However, this is not absolutely necessary. Irregular distances can also be present.

The at least one gap can be formed in the shape of a circle, oval or polygon. However, any other geometric shape is also possible.

In particular, several gaps can be provided which have different shapes.

Furthermore, outside of the light guiding channel, an angle-selective absorption layer can be arranged in front of the at least one gap of the first reflecting layer, which absorption layer absorbs light which strikes the absorption layer at an angle from a range from a predetermined first critical angle up to 90° and transmits light which strikes at an angle of from 0° up to a predetermined second critical angle which is smaller than or equal to the first critical angle. Through this, e.g. a light bundle exiting the light guiding channel through the gap can be absorbed straight away. This leads to the advantage that this light bundle cannot lead to undesired scattered light which could occur in a further reflection of the light bundle on e.g. a material boundary surface in the direction back to the light guiding channel.

Between the at least one gap and the reflecting layer, a transition area can be formed in which the reflectivity increases in the direction from the gap to the reflecting layer. The increase can in particular be continuous and/or steady.

In particular, the light guiding channel can comprise a second reflecting layer which is opposite the first reflecting layer. The second reflecting layer can also comprise at least one transparent gap.

In particular, the at least one transparent gap of the first reflecting layer can be opposite a transparent gap of the second reflecting layer.

Furthermore, the two opposite reflecting layers can be formed alike. In particular they can be formed to be congruent.

The first reflecting layer can be formed flat or curved. The same applies to the second reflecting layer.

The reflecting layer is in particular a mirror layer which has a reflectivity of 100% or almost 100% for visible light. However, it is also possible for the reflecting layer to be formed as partially transparent layer.

The at least one gap can preferably have a transmittance of 100% or almost 100% for light from the visible wavelength range. However, it is also possible for the transmissive gap to be formed as partially transparent layer which has a certain reflecting property. In any case, however, the reflecting property of the transmissive gap is lesser than that of the reflecting layer. The reflectivity of the reflecting layer is thus always higher than the reflectivity of the gap or gaps.

Both the reflecting layer and the area of the gaps can in each case be formed as metallic layer or metallic coating. It is also possible for the reflecting layer and the gaps to be formed such that a polarization-dependent reflection is present. In particular, light bundles of a first polarization state can be reflected (at least reflected in part) and light bundles of a second polarization state which is orthogonal to the first polarization state can be transmitted.

The front side and/or the rear side can be formed curved. In particular, the rear side can have a curvature which is chosen such that a correction of defective vision is brought about. This leads to the advantage that the desired correction of defective vision is also present for the coupled-out light bundles, as these are coupled out such that they exit the spectacle lens via the rear side.

The spectacle lens can be formed with several shells and e.g. comprise an inner shell and an outer shell. In particular, the inner and outer shell are formed from the same materials.

In addition, the inner shell can be joined flat to the outer shell (e.g. glued or cemented with an optical cement or optical adhesive).

Preferably, the sides of the inner and outer shell which face towards each other are formed complementary to each other.

In particular, these sides which face towards each other can be spherically curved.

In addition, the outside and/or the inside can be spherically curved.

Of course more than two shells can also be provided.

The coupling-out section can comprise several reflective deflecting surfaces arranged next to each other. The reflective deflecting surfaces can also be referred to as reflective facets. They can have a reflectivity of almost 100% and in this case be referred to as mirror surfaces. It is also possible for them to have a lower reflectivity and thus be formed partially transparent.

The reflective deflecting surfaces can in each case be formed flat or curved. Furthermore, the deflecting surfaces can reproduce a curved reflecting surface in a Fresnel manner which also has an imaging property in addition to a pure beam deflection.

The coupling-out section can be buried in the spectacle lens. In particular, the coupling-out section can be formed such that the front side of the spectacle lens is a smooth, continuous surface.

The coupling-in section can be formed in an edge area of the spectacle lens and the coupling-out section can be formed in a central area of the spectacle lens.

The inner shell and the outer shell (and any further shells) can in each case be formed in one piece. However, it is also possible for the inner shell and/or the outer shell (and/or any further shells) to be formed in several parts.

Furthermore, a display device is disclosed, with a holder that can be fitted on the head of a user, an image-generating module secured to the holder, which generates an image, and an imaging optical system secured to the holder, which comprises a spectacle lens according to one of the above claims and which, when the holder is fitted on the head of the user, images the generated image such that the user can perceive it as a virtual image.

The imaging optical system can comprise the spectacle lens as the only optical element. However, it is also possible for the imaging optical system to comprise, in addition to the spectacle lens, also at least one further optical element. In particular, the outer shell can be formed in one piece together with the at least one further optical element. Alternatively, it is possible for the outer shell to be joined to the at least one further optical element (e.g. through cementing or bonding). Furthermore, the at least one further optical element can be spaced apart from the outer shell.

The at least one further optical element can be e.g. a collimation optical system which is arranged between the spectacle lens and the image-generating module, with the result that the light bundles from the image-generating module can be coupled into the spectacle lens as collimated bundles.

Furthermore, the display device can comprise a control unit which actuates the image-generating module.

The image-generating module can in particular comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can in particular be formed such that it generates a monochromatic or a multi-coloured image.

The display device can comprise further elements known to a person skilled in the art which are necessary for its operation.

It is understood that the features named above and those yet to be explained below can be used not only in the stated combinations but also in other combinations or alone, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
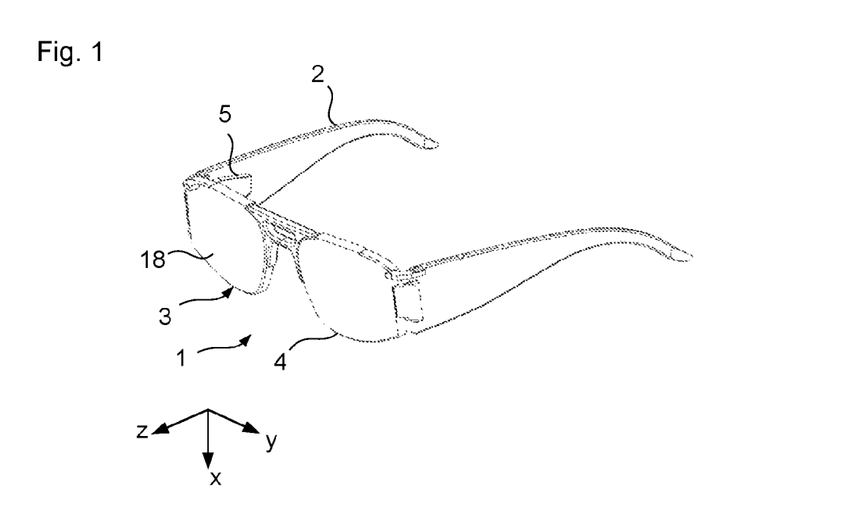
FIG. 1 is a schematic perspective representation of an example embodiment of the display device according to the invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as is described below.

For this, the display device 1 comprises an image-generating module 5, which can be arranged in the area of the right-hand temple stem of the holder 2, as is represented schematically in FIG. 1. The image-generating module 5 can comprise a two-dimensional image-generating element 6 (FIG. 2), such as e.g. an OLED, a CMOS or an LCoS chip or a tilting mirror matrix, with a plurality of pixels arranged e.g. in columns and rows.

The spectacle lenses 3 and 4, and in particular the first spectacle lens 3, are only described together with the display device 1 according to the invention by way of example. The spectacle lenses 3, 4, or at least the first spectacle lens 3, are in each case formed individually as a spectacle lens 3, 4 according to the invention or as an optical element according to the invention. The optical element according to the invention can also be used in another context than with the display device 1 described here. Therefore, the optical element, when it is formed as a spectacle lens, can, of course, also be formed as second spectacle lens 4.

Figure 2:
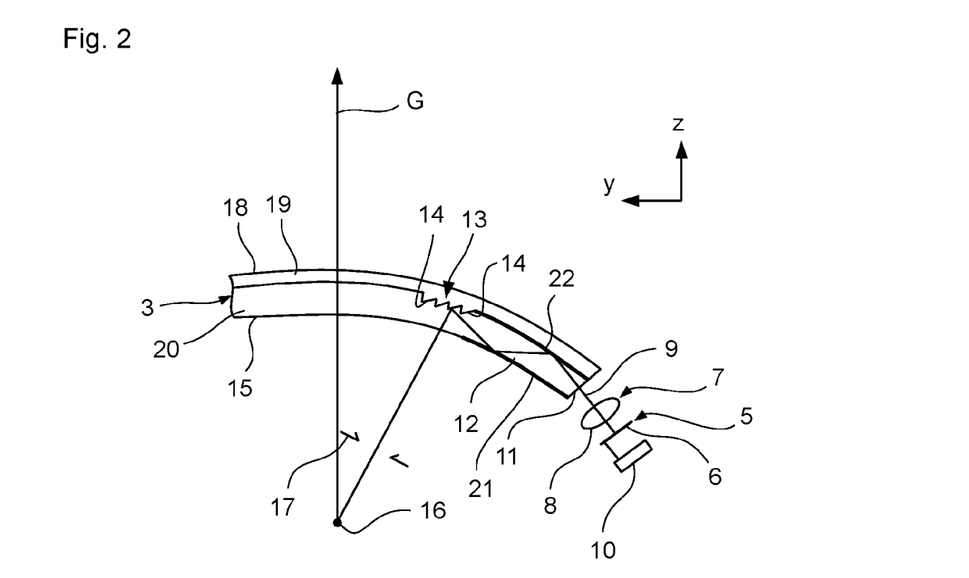
FIG. 2 is an enlarged partial sectional view of the first spectacle lens including a schematic representation of the image-generating module.

As can best be seen from the enlarged schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also serves as part of the imaging optical system 7.

A light bundle 9 can emerge from each pixel of the imaging system 6. The desired image can be generated by correspondingly actuating the pixels of the imaging system 6 by means of a control unit 10, which can be part of the image-generating module 5. In FIG. 2, the beam path of a light beam is drawn in to represent the light bundles 9, with the result that the light beam 9 is also discussed below.

The light beam 9 emerging from the imaging system 6 runs through the optical element 8 and enters the first spectacle lens 3 via a coupling-in section 11 (here the end face of the first spectacle lens 3), and is guided in this along a light guiding channel 12 to a coupling-out section 13. The coupling-out section 13 comprises several reflective deflecting surfaces 14 (which can also be referred to as reflective facets) arranged next to each other on which a reflection of the light beams 9 takes place in the direction of a rear side 15 of the first spectacle lens 3, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look towards the right by approx. 40° relative to the direction of view G of a forward view. In FIG. 2, the centre of rotation 16 of the user's eye as well as the eyebox 17 or the exit pupil 17 of the imaging optical system is drawn in for clarification. The eyebox 17 is the area which is provided by the display device 1 and in which the user's eye can move and he can still always see the generated image as a virtual image.

Although in the described embodiment the coupling-in is carried out via the end face of the first spectacle lens 3 and thus the coupling-in section 11 is formed on the end face of the first spectacle lens 3, it is also possible to carry out a coupling-in via the rear side 15 of the first spectacle lens.

As is shown in the schematic representation in FIG. 2, both the rear side 15 and the front side 18 of the first spectacle lens 3 are formed curved.

Furthermore, the first spectacle lens 3 is formed with two shells and comprises an outer shell 19 and an inner shell 20.

The light guiding channel 12 comprises two reflecting layers 21, 22 which are opposite each other and which in each case extend from the coupling-in section 11 to the coupling-out section 13. The first reflecting layer 21 is formed on the rear side 15. The second reflecting layer 22 is formed between the inner shell 20 and the outer shell 19.

Figure 3:
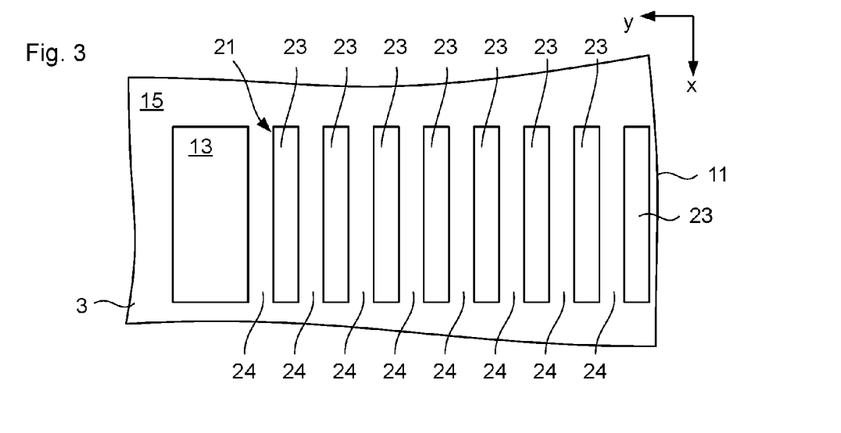
FIG. 3 is a schematic enlarged view of the rear side of the spectacle lens according to the invention in the area of the light guiding channel and the coupling-out section.

As can be learned in particular from the enlarged view on the rear side 15 of the spectacle lens 3 according to FIG. 3, the first reflecting layer 21 is not formed as a continuous layer between the coupling-in section 11 and the coupling-out section 13, but rather as a segmented layer. The first reflecting layer 21 thus comprises reflecting segments 23, which are spaced apart from each other in a first direction from the coupling-in section 11 to the coupling-out section 13, with the result that gaps 24 are present between the reflecting segments 23. In these gaps 24 no material of the reflecting layer 21 is applied. The gaps 24 are thus transparent.

Figure 4:
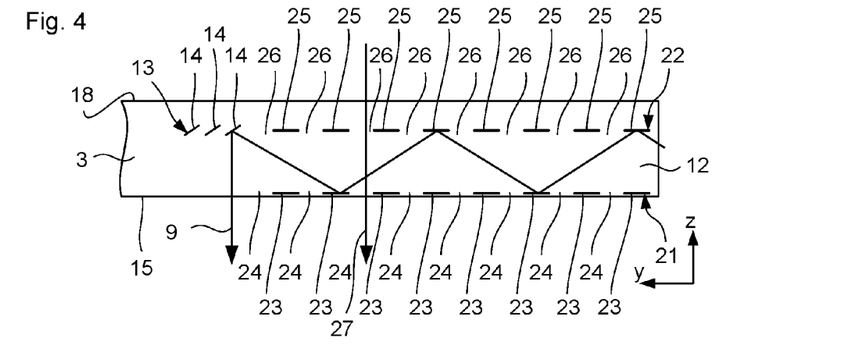
FIG. 4 is a schematic enlarged sectional view according to FIG. 2 through the light guiding channel, where, to simplify the representation, the front and rear side, the reflecting layers and the coupling-out section are represented with straight lines and not curved.

In the schematic, enlarged sectional view in FIG. 4, it can be seen that the second reflecting layer 22 comprises, in the same manner as the first reflecting layer 21, reflecting segments 25 with gaps 26 provided between them. The reflecting segments 23 and 25 of the two reflecting layers 21, 22 are arranged such that they are opposite each other. The gaps 24 and 26 are thus also opposite each other and thus form transparent areas which run through the two reflecting layers 21 and 22.

As is indicated further in FIG. 4, the light bundles 9 are guided by reflections on the reflecting layers 21 and 22, or on the corresponding reflecting segments 23 and 25, from the coupling-in section 11 to the coupling-out section 13. On the coupling-out section 13, the light bundles are then deflected by reflection on the facets 14 in the direction of the rear side 15 such that they are coupled out of the first spectacle lens 3.

Furthermore, because of the gaps 24, 26 which are provided, ambient light 27 can run through the light guiding channel 12 and be perceived by the user when the display device 1 is fitted on.

To simplify the representation, in FIG. 4 the reflecting layers 21, 22, the front side 18, the rear side 15 and the coupling-out section 13 are shown flat in each case. In fact, they are formed curved in the described embodiment. In a modification, however, the reflecting layer 21, the reflecting layer 22, the front side 18, the rear side 15 and/or the coupling-out section 13 can be formed flat. The layers and/or sides which are not formed flat are then curved.

In the spectacle lens 3 according to the invention, through the size and arrangement of the reflecting segments 23, 25 and through the size and arrangements of the gaps 24, 26, the transmittance of the light guiding channel 12 can thus be set. It is thus possible for a user to still perceive the surroundings even in the area of the light guiding channel 12.

The transmission through the light guiding channel results essentially from the relationship between the surface of the reflecting segments 23 or 25 and the surface of the gaps 24 and 26, as well as from the relative arrangement of the reflecting segments 23 of the first reflecting layer with respect to the reflecting segments of the second reflecting layer 22.

Figure 5:
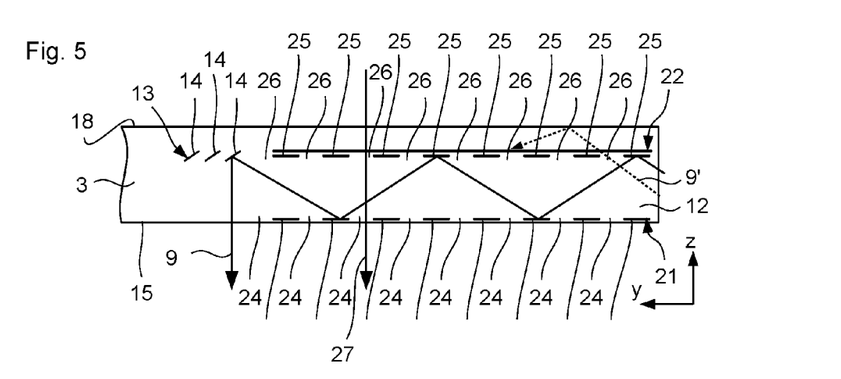
FIG. 5 is a modification of the spectacle lens according to the invention in a sectional representation according to FIG. 4.

In FIG. 5, in the same manner as in FIG. 4, in a sectional view a further embodiment is shown which differs from the previously described embodiment in particular in that outside the light guiding channel 12 an angle-selective absorption layer 28 is arranged in front of the gaps 24 of the second reflecting layer 21. This serves to suppress scattered light. Thus, for example, a light bundle 9' can strike the curved front side 18 through a gap 26 and be reflected by this front side 18 back in the direction of the light guiding channel 12. This light bundle 9' can then strike the absorption layer 28 at such an angle that it is absorbed by this and does not enter the light guiding channel again. For this, the angle-selective absorption layer is designed such that it is transmissive for an angle of incidence of from 0° up to a predetermined first critical angle and is absorbing for an angle of incidence greater than a predetermined second critical angle which is greater than or equal to the first critical angle, up to 90° (always relative to the normal on the absorption layer 28). The absorption layer 28 is thus transmissive for ambient light 27, as is indicated in FIG. 5.

The described segmentation of the first and second reflecting layer 21 and 22 is only to be understood by way of example and, of course, any other geometric sectioning or segmentation can also be carried out.

Figure 6:
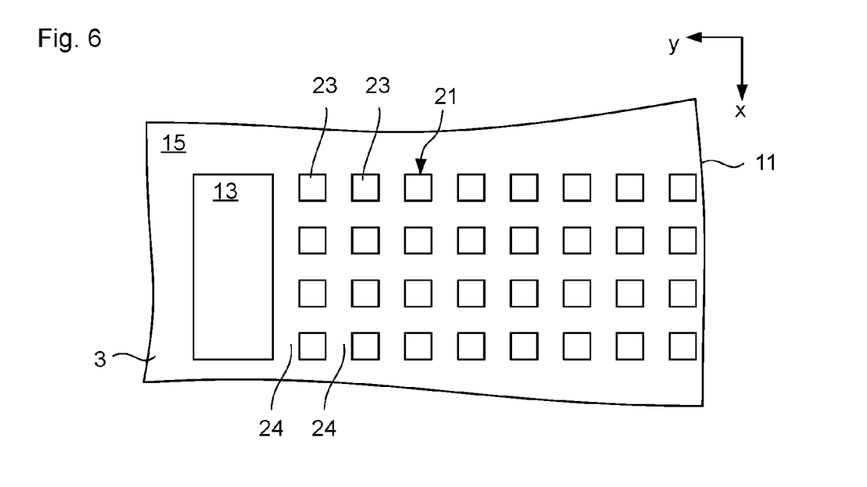
FIG. 6 is a modification of the spectacle lens according to the invention in a view according to FIG. 3.

For instance, the reflecting segments 23 can, for example, be squares which are arranged in a regular pattern, as is shown in FIG. 6.

Figure 7:
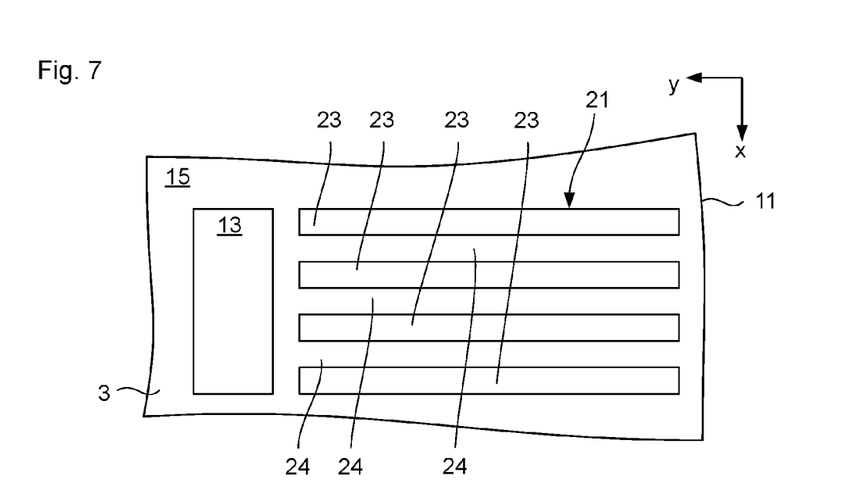
FIG. 7 is a modification of the spectacle lens according to the invention in a view according to FIG. 3.

It is also possible for the reflecting segments 23 to be rectangles which extend in the first direction and are spaced apart transverse thereto, as is shown in FIG. 7.

Figure 8:
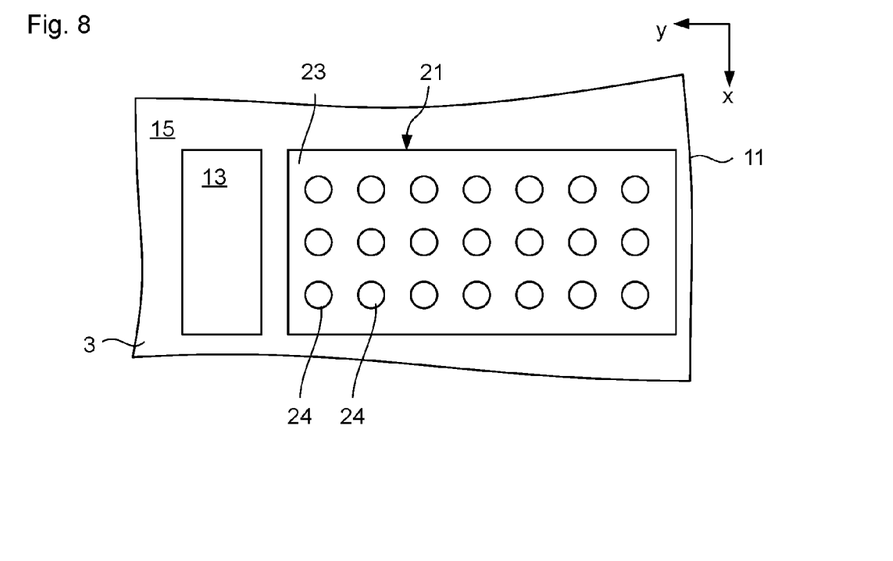
FIG. 8 is a modification of the spectacle lens according to the invention in a view according to FIG. 3.

In the variant according to FIG. 8, the gaps 24 are formed circular and arranged in a regular pattern.

Figure 9:
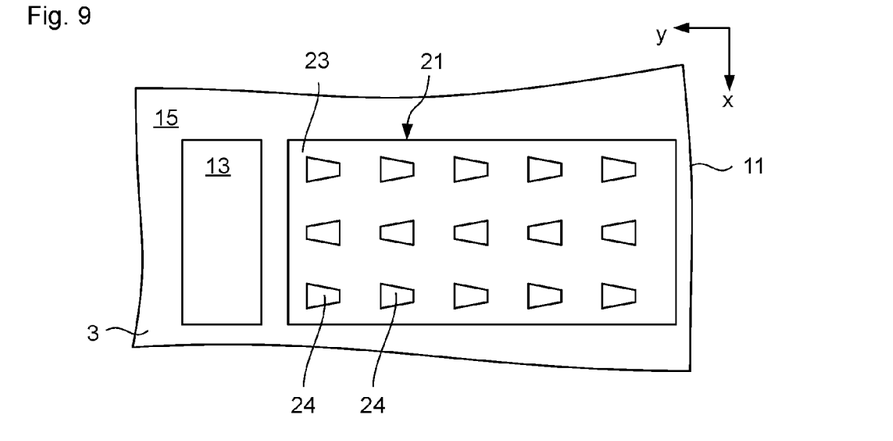
FIG. 9 is a modification of the spectacle lens according to the invention in a view according to FIG. 3.

It is also possible to form the gaps trapezoidal and arrange them accordingly, as is shown in FIG. 9.

Figure 10:
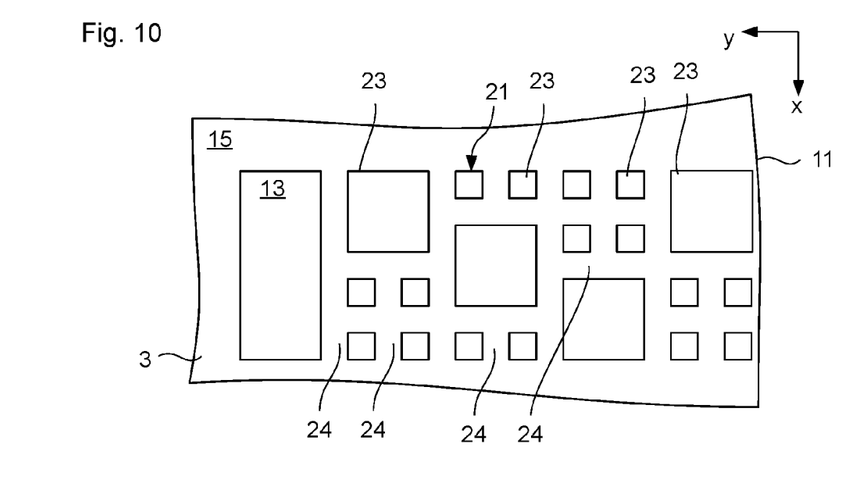
FIG. 10 is a modification of the spectacle lens according to the invention in a view according to FIG. 3.

In the embodiment shown in FIG. 10, the reflecting segments 23 are squares of different sizes.

Figure 11:
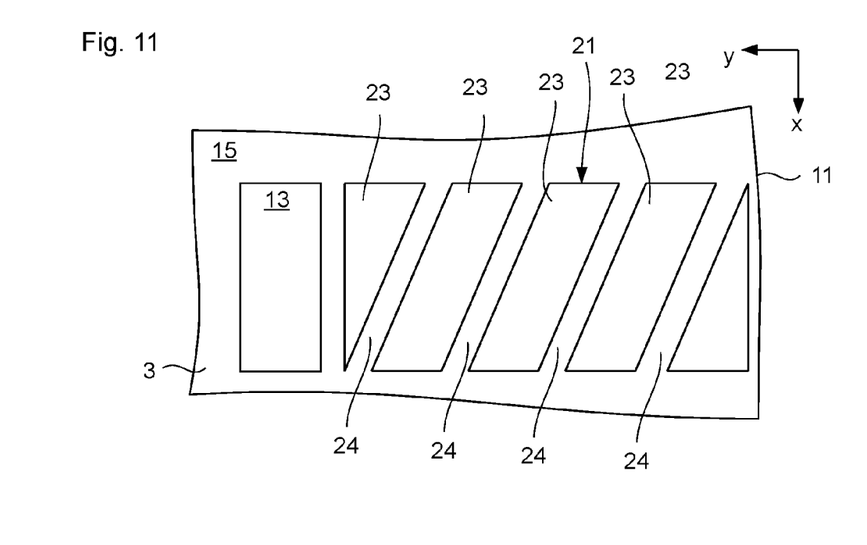
FIG. 11 is a modification of the spectacle lens according to the invention in a view according to FIG. 3.

In the embodiment shown in FIG. 11, the reflecting segments are essentially strips running at an angle with respect to the x-direction and the y-direction.

Of course, the arrangement of the gaps does not have to be regular. An arrangement with differing distances is also possible.

Furthermore, other shapes for the gaps 24 and for the reflective segments 23 from those already described are possible. For instance, polygons, ovals etc. can be used as shapes. It is also not necessary to use the same shapes. Different shapes can be used for the gaps and/or segments.

The reflecting segments preferably have a reflectivity of 100% or almost 100% for visible light. However, it is also possible for them to have a lower reflectivity.

The gaps can be 100% transmissive or also have a certain reflectivity. In the latter case, the gaps would be partially transparent. In any case, the reflectivity of the gaps is always lower than the reflectivity of the reflecting segments, and in the same manner the transmissivity of the gaps 24, 26 is always greater than the transmissivity of the reflecting segments 23, 25.

Figure 12:
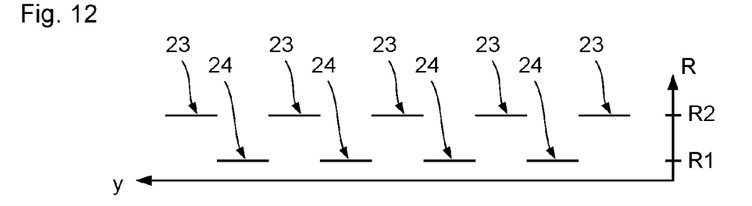
FIG. 12 is a representation of the reflection profile of the first reflecting layer in the y-direction.

Until now it has been assumed that the transition between the reflecting segments 23 and the gaps 24 is stepwise. For the embodiment according to FIGS. 3 and 4 for the first reflecting layer 21, this is represented enlarged in FIG. 12 for some reflecting segments 23 and gaps 24. The reflecting segments 23 here have a reflectivity R2 and the gaps 24 a reflectivity R1, wherein the reflectivity R2 is greater than the reflectivity R1. For instance, R2 can for example have a reflectivity of 100% or almost 100% and R1 a reflectivity of 0% or almost 0%. However, other values for R1 and R2 are also possible. The essential thing is that R2 is always greater than R1.

In a development, the transition between the reflecting segments 23 and the gaps 24 does not have to be stepwise. There can be a continuous transition, as is indicated by the edges 30 in the representation according to FIG. 13.

Figure 13:
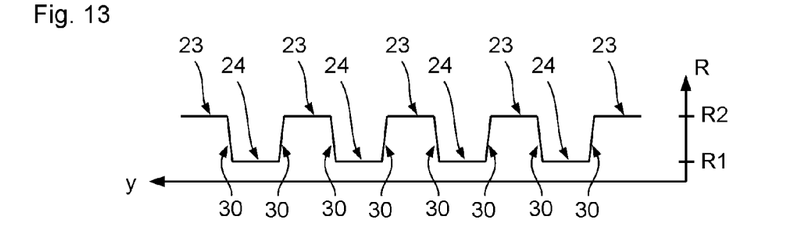
FIG. 13 is a representation of the reflection profile of a development of the first reflecting layer in the y-direction.

Although there is a continuous transition in this embodiment, this starts suddenly or abruptly at the reflecting segments 23 and the gaps 24, with the result that the reflectivity profile has a kink at this point and is not continuous.

Figure 14:
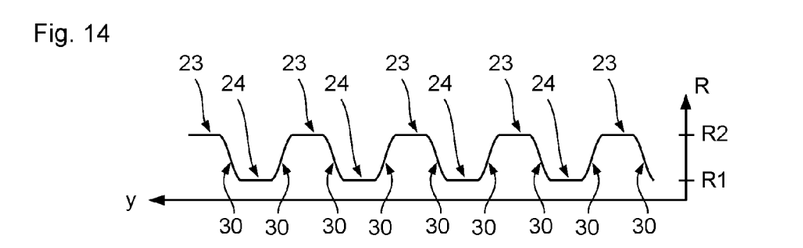
FIG. 14 is a representation of the reflection profile of a development of the first reflecting layer in the y-direction.
Figure 15:
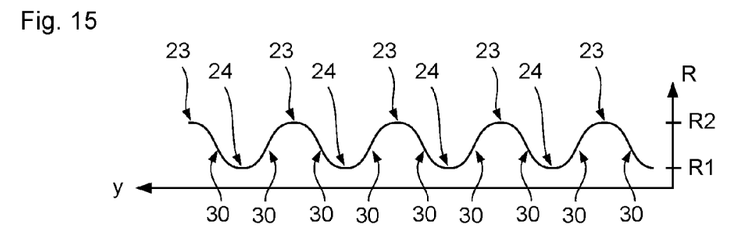
FIG. 15 is a representation of the reflection profile of a development of the first reflecting layer in the y-direction.

Of course, the reflectivity profile can also be continuous, as is indicated in FIG. 14. In particular, the reflectivity profile can also be continuous over the reflecting segments 23 and the gaps 24, as is indicated in FIG. 15. The essential thing is that there are sections with a higher reflectivity (reflecting segments 23) and sections with a lower reflectivity (gaps 24).

Of course, the developments described in connection with FIGS. 12 to 15 can also be provided for the second reflecting layer 22.

In the spectacle lens 2 according to the invention, the rear side 15 can in particular have a curvature in order to bring about a correction of defective vision. It is thus advantageously achieved that the represented virtual image can also be perceived sharply by the user, as the coupling-out of the light bundles 9 takes place via the rear side 15, which is the correction surface for the user.

In the previously described embodiment, the structure of the spectacle lens was with two shells. A structure with more than two shells is also possible. For example, a further inner shell can be provided which rests against the inner shell 20. In this case, both reflecting layers 21 and 22 would be buried in the spectacle lens 3.

Figure 16:
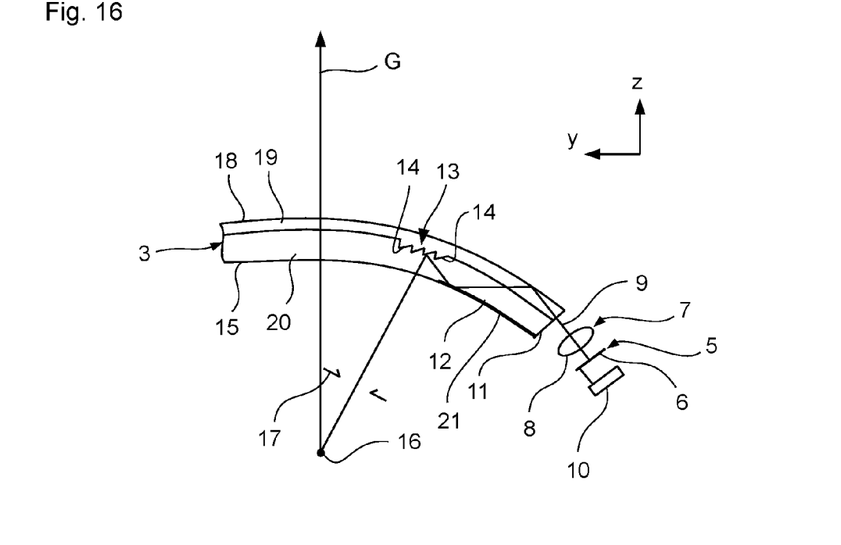
FIG. 16 is a further embodiment of the spectacle lens according to the invention in a sectional view according to FIG. 2.

In FIG. 16, a modification of the spectacle lens according to the invention is represented in the same manner as in FIG. 2, wherein in this modification the second reflecting layer 22 is not provided and instead of this a total internal reflection takes place on the front side 18.

Figure 17:
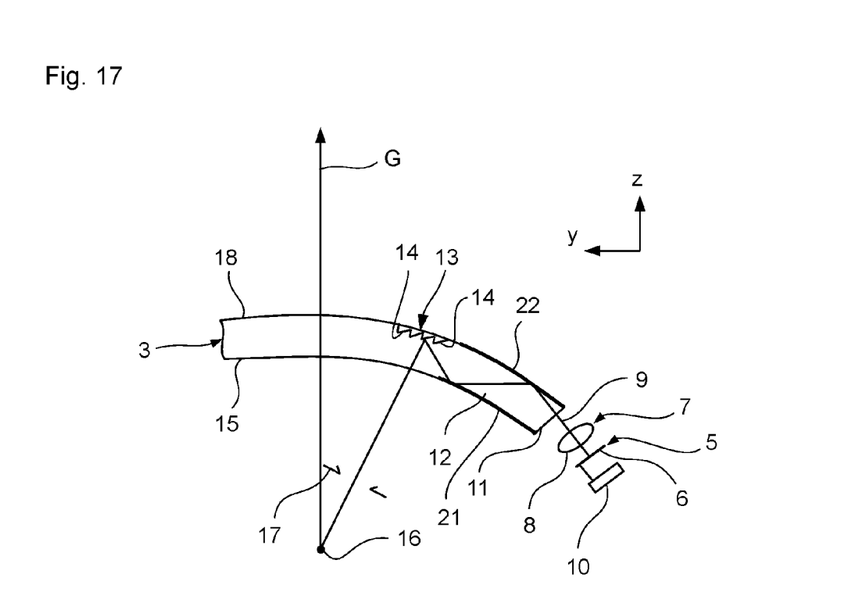
FIG. 17 is a further embodiment of the spectacle lens according to the invention in a sectional view according to FIG. 2.

In FIG. 17, a further modification is shown in which the spectacle lens 3 is formed with one shell. Again, two reflecting layers 21 and 22 are provided, which in this case are arranged on the rear side 15 and the front side 18. The reflective facets 14 are formed buried and are preferably filled with material of the spectacle lens 3 such that the front side 18 is a smooth, continuous side.

The materials of the inner and outer shell 20 and 19 are preferably the same, with the result that they have an identical refractive index. The inner and outer shell 20 and 19 are preferably glued over the whole surface, with the result that a compact first spectacle lens 3 is present.

In the display device 1 according to the invention, the reflection of the virtual image into the user's field of view takes place via the first spectacle lens 3. Of course, a reflection via the second spectacle lens 4 is also possible. In addition, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct vision defects). As is shown in the figures, both the front side 11 and the rear side 12 of the spectacle lens 3 are formed curved. In particular, the front side 11 can be spherically curved. If the spectacle lens has a refractive power different from zero, in order to correct defective vision, as a rule the curvature of the rear side 15 is chosen appropriately in order to achieve the appropriate correction. The rear side 15 can have a curvature which deviates from the spherical form.

The holder 2 does not have to be formed as a spectacles-type holder. Any other type of holder with which the display device can be fitted or worn on the head of the user is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens comprising:
   a front side and a rear side;
   a coupling-in section
   a coupling-out section spaced apart from the coupling-in section; and
   a light guiding channel configured to guide light bundles of pixels of the generated image, which are coupled into the spectacle lens via the coupling-in section of the spectacle lens, in the spectacle lens to the coupling-out section, by which they are coupled out of the spectacle lens,
   wherein the light guiding channel comprises a first reflecting layer, which extends from the coupling-in section to the coupling-out section and on which the light bundles are reflected for guiding to the coupling-out section, and
   wherein the first reflecting layer comprises at least one transparent gap such that a portion of the light bundles pass through the first reflecting layer.

2. The spectacle lens according to claim 1, wherein the first reflecting layer comprises several transparent gaps spaced apart from each other.

3. The spectacle lens according to claim 2, wherein the several gaps are spaced apart in a first direction from the coupling-in section towards the coupling-out section or transverse to the first direction.

4. The spectacle lens according to claim 3, wherein the several gaps are arranged equidistantly in a predetermined direction.

5. The spectacle lens according to claim 2, wherein the several gaps are arranged equidistantly in a predetermined direction.

6. The spectacle lens according to claim 1, wherein the at least one gap is shaped as a circle, an oval or a polygon.

7. The spectacle lens according to claim 1, wherein the first reflecting layer is segmented and includes a plurality of transparent gaps.

8. The spectacle lens according to claim 1, wherein, outside of the light guiding channel, an angle-selective absorption layer is arranged in front of the at least one gap of the first reflecting layer, which absorption layer absorbs light which strikes the absorption layer at an angle from a range from a predetermined first critical angle up to 90° and transmits light which strikes at an angle of from 0° up to a predetermined second critical angle, wherein the second critical angle is smaller than or equal to the first critical angle.

9. The spectacle lens according to claim 1, wherein, between the at least one gap and the reflecting layer, a transition area is disposed, in which the reflectivity increases in the direction from the gap to the reflecting layer.

10. The spectacle lens according to claim 1, wherein the light guiding channel comprises a second reflecting layer which is opposite the first reflecting layer.

11. The spectacle lens according to claim 10, wherein the second reflecting layer comprises at least one transparent gap.

12. The spectacle lens according to claim 11, wherein at least one transparent gap of the first reflecting layer is opposite a transparent gap of the second reflecting layer.

13. The spectacle lens according to claim 1, wherein the coupling-out section comprises several reflective deflecting surfaces arranged adjacent to each other.

14. The spectacle lens according to claim 1, wherein the coupling-out section is buried in the spectacle lens.

15. A display device, comprising:
    a holder configured to be fitted on the head of a user;
    an image-generating module secured to the holder, which is configured to generate an image; and
    an imaging optical system secured to the holder, which comprises a spectacle lens according to claim 1 and which, when the holder is fitted on the head of the user, is configured to image the generated image such that the user can perceive the generated image as a virtual image.

* * * * *